United States Patent
Ide et al.

(10) Patent No.: US 8,723,449 B2
(45) Date of Patent: May 13, 2014

(54) LIGHT EMITTING ELEMENT DRIVE CIRCUIT

(75) Inventors: Masahiro Ide, Osaka (JP); Hideki Shioe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/117,810

(22) PCT Filed: Apr. 2, 2012

(86) PCT No.: PCT/JP2012/059005
§ 371 (c)(1),
(2), (4) Date: Nov. 14, 2013

(87) PCT Pub. No.: WO2012/157351
PCT Pub. Date: Nov. 22, 2012

(65) Prior Publication Data
US 2014/0097762 A1     Apr. 10, 2014

(30) Foreign Application Priority Data

May 16, 2011     (JP) ................................. 2011-109828

(51) Int. Cl.
*H05B 41/36*     (2006.01)

(52) U.S. Cl.
USPC ............ 315/307; 315/308; 315/226; 315/312

(58) Field of Classification Search
USPC .......... 315/185 R, 186, 192, 193, 209 R, 210, 315/224, 226, 291, 294, 297, 299, 307, 308, 315/312, 313, 320
See application file for complete search history.

(56) References Cited

U.S. PATENT DOCUMENTS

| | | | |
|---|---|---|---|
| 4,783,602 A * | 11/1988 | Viswanathan | 327/94 |
| 2004/0208011 A1 | 10/2004 | Horiuchi et al. | |
| 2005/0093473 A1* | 5/2005 | Yeh et al. | 315/185 R |
| 2008/0111800 A1* | 5/2008 | Wang et al. | 345/204 |
| 2008/0116821 A1* | 5/2008 | Weger et al. | 315/250 |
| 2009/0146932 A1 | 6/2009 | Osaka | |
| 2009/0189846 A1 | 7/2009 | Nishikawa et al. | |
| 2010/0109537 A1 | 5/2010 | Nishino et al. | |
| 2013/0271008 A1* | 10/2013 | Lin et al. | 315/122 |

FOREIGN PATENT DOCUMENTS

| | | |
|---|---|---|
| JP | 2003-332624 A | 11/2003 |
| JP | 2007-281263 A | 10/2007 |
| JP | 2008-130296 A | 6/2008 |
| JP | 2008-243641 A | 10/2008 |
| JP | 2009-141240 A | 6/2009 |
| JP | 2009-175382 A | 8/2009 |
| JP | 2010-225996 A | 10/2010 |

* cited by examiner

*Primary Examiner* — Douglas W Owens
*Assistant Examiner* — Jianzi Chen
(74) *Attorney, Agent, or Firm* — Birch, Stewart, Kolasch & Birch, LLP

(57) ABSTRACT

An LED drive circuit (10) for driving an LED circuit (220) includes: a constant current driver (110) including transistors (111-114) whose collector terminals are respectively connected with LED rows (221-224) connected with each other in parallel and whose emitter terminals are grounded; and an LED drive control section (120) for setting a voltage to be commonly applied on the LED rows (221-224), the setting being performed in accordance with a maximum base current out of base currents of the transistors (111-114).

4 Claims, 7 Drawing Sheets

LIGHT EMITTING ELEMENT DRIVE CIRCUIT

TECHNICAL FIELD

The present invention relates to a light emitting element drive circuit for driving a light emitting element which is driven with a high voltage, such as an LED (Light Emitting Diode).

BACKGROUND ART

Recently, light emitting elements such as LEDs (Light Emitting Diodes) are used as a plane light source such as a backlight of a liquid crystal display. In a case where LEDs are used as a plane light source, normally, a plurality of LEDs are connected with each other in series to form an LED row, and a plurality of LED rows are connected with each other in parallel to form an LED matrix. A transistor is inserted in series in each LED row. A current flowing through the LED row is made constant by the transistor.

However, individual LEDs have variations in forward voltage drop. Consequently, there are variations in a collector-emitter voltage to be applied on the transistor inserted in each LED row. Accordingly, in a case of an LED matrix used as a plane light source, it is necessary to set a voltage to be applied commonly on the LED rows to be higher in order that the transistor inserted in each LED row makes a current constant in an active region, i.e. a voltage applied on the transistor inserted in each LED row (collector-emitter voltage) surely exceeds a saturation voltage.

In order to deal with such a problem, Patent Literature 1 discloses a light emitting device including a light emitting element drive circuit which applies as small voltage as possible to individual LED rows.

With reference to FIG. 6, the following description will discuss a light emitting device described in Patent Literature 1. FIG. 6 is a circuit diagram of the light emitting device described in Patent Literature 1. As illustrated in FIG. 6, the light emitting device includes an LED drive circuit 50 and an LED light source circuit 60.

As illustrated in FIG. 6, the LED light source circuit 60 includes a switching circuit 61 and an LED circuit 62. The LED circuit 62 is obtained by connecting four LED rows 621 to 624 in parallel, and corresponds to the aforementioned LED matrix. The switching circuit 61 increases or decreases a voltage to be applied commonly on the four LED rows 621 to 624. As illustrated in FIG. 6, the switching circuit 61 includes a power source voltage 611, a coil 612, a transistor 613, a diode 614, and a capacitor 615.

As illustrated in FIG. 6, the LED drive circuit 50 includes a constant current driver 51, an LED drive control section 52, and a DCDC controller 53. The constant current driver 51 includes (i) transistors 511 to 514 which are connected in series with the LED rows 621 to 624, respectively, and (ii) resistors 515 to 518 which are connected in series with the LED rows 621 to 624, respectively. As illustrated in FIG. 6, an emitter terminal of the transistor 514 is connected with one input terminal of an operational amplifier 521, and a base terminal of the transistor 514 is connected with an output terminal of the operational amplifier 521. Consequently, as long as a voltage equal to or larger than a saturation voltage is applied across a collector and an emitter of the transistor 514 and the transistor 514 operates in an active region, a current flowing through the LED row 624 is made constant. The transistors 511 to 513 are connected with operational amplifiers (not shown) similarly, and constitute constant current circuits which make currents flowing through the LED rows 621 to 623 constant, respectively.

The LED drive control section 52 includes the operational amplifier 521, cooperates with the constant current driver 51 to realize a constant current function, and controls the DCDC controller 53 so that the minimum value of a collector-emitter voltage of each of the transistors 511 to 514 is kept a little larger than a saturation voltage of the transistors 511 to 514. Specifically, a comparison circuit 527 generates a difference Δ between the minimum value Vmin of the collector voltages of the transistors 511 to 514 and a reference voltage Vref supplied from a constant voltage source 522, and the DCDC controller 53 controls a direct current voltage to be supplied to a switching circuit 61 so that the difference ΔV is 0.

With this configuration, the light emitting device of Patent Literature 1 drives LEDs while preventing excessive application of voltages on the LEDs.

CITATION LIST

Patent Literatures

[Patent Literature 1]
Japanese Patent Application Publication No. 2003-332624 (published on Nov. 21, 2003)
[Patent Literature 2]
Japanese Patent Application Publication No. 2008-130296 (published on Jun. 5, 2008)

SUMMARY OF INVENTION

Technical Problem

However, in the technique of Patent Literature 1, for example, in a case where a new LED row is added to a light emitting element drive device including the LED circuit 62 with which four LED rows are connectable via transistors, the light emitting element drive device is required to further include an LED drive control section 52' as illustrated in FIG. 7. FIG. 7 is a circuit diagram illustrating a circuit of a light emitting device in a case where a new LED row is added with use of the LED drive control section 52 described in Patent Literature 1.

As illustrated in FIG. 7, addition of an LED row 625 requires newly providing the LED drive control section 52' and a detection circuit 54 including a transistor 541 and a resistor 542.

Therefore, in the technique of Patent Literature 1, addition of one LED row requires providing an LED drive control section capable of controlling four LED rows. This raises problems of excessive circuit size and higher costs.

One possible solution to these problems may be addition of an LED row by simply providing a current mirror circuit used in, for example, an LED lighting circuit in Patent Literature 2. However, since the LED drive control section 52 does not include an input terminal connectable with a collector terminal of a transistor constituting a current mirror circuit, it is necessary to newly provide an LED drive control section after all, which cannot solve the aforementioned problems.

The present invention was made in view of the foregoing problems. An object of the present invention is to provide a light emitting element drive circuit which allows for easy addition of a light emitting element.

Solution to Problem

In order to solve the foregoing problems, a light emitting element drive circuit of the present invention is a light emitting element drive circuit for driving a light emitting element circuit in which a plurality of light emitting elements are connected with each other in parallel, the light emitting element drive circuit including: a constant current driver including a plurality of transistors whose collector terminals are connected with the respective plurality of light emitting elements and whose emitter terminals are grounded; and a control circuit for setting a voltage, to be commonly applied to the plurality of light emitting elements, in accordance with a maximum base current out of base currents of the respective plurality of transistors.

With the arrangement, the control circuit can realize a low-loss control function without referring to voltages of the collector terminals of the respective transistors. This allows reducing the number of input terminals and downsizing circuit size. Furthermore, since it is unnecessary for the control circuit to refer to voltages of collector terminals of the respective transistors which voltages can be high, it is unnecessary for the control circuit to have a high withstand voltage.

With the arrangement, addition of a light emitting element in parallel to the light emitting elements connected in parallel can be easily made by connecting a circuit including two or more switching elements sharing a base current. This is because the sharing of a base terminal between the newly provided switching elements makes it unnecessary for the control circuit to have a new connection terminal to be connected with the base terminal of the newly provided switching elements, thereby eliminating the necessity of adding a new comparison circuit.

Since it is unnecessary to add a new control circuit, it is possible to keep down an increase in circuit size and to reduce costs for addition of a new control circuit in a case where the light emitting element is added.

In order to solve the foregoing problems, a method of the present invention of adding an additional light emitting element is a method of adding an additional light emitting element to a light emitting element circuit in which a plurality of light emitting elements are connected with each other in parallel, the method including the step of: connecting one of the plurality of light emitting elements with the additional light emitting element with use of a current mirror circuit which flows identical currents through the additional light emitting element and said one of the plurality of light emitting elements.

With the arrangement, addition of an additional light emitting element in parallel to the light emitting elements connected in parallel is made with use of the current mirror. This allows flowing identical currents through the additional light emitting element and one of the plurality of light emitting elements, thereby allowing for easy addition of the additional light emitting element.

Advantageous Effects of Invention

In order to solve the foregoing problems, a light emitting element drive circuit of the present invention is a light emitting element drive circuit for driving a light emitting element circuit in which a plurality of light emitting elements are connected with each other in parallel, the light emitting element drive circuit including: a constant current driver including a plurality of transistors whose collector terminals are connected with the respective plurality of light emitting elements and whose emitter terminals are grounded; and a control circuit for setting a voltage, to be commonly applied to the plurality of light emitting elements, in accordance with a maximum base current out of base currents of the respective plurality of transistors.

With the arrangement, it is possible to provide a light emitting element drive circuit which allows for easy addition of a light emitting element.

DESCRIPTION OF EMBODIMENTS

Embodiment 1

Figure 1:
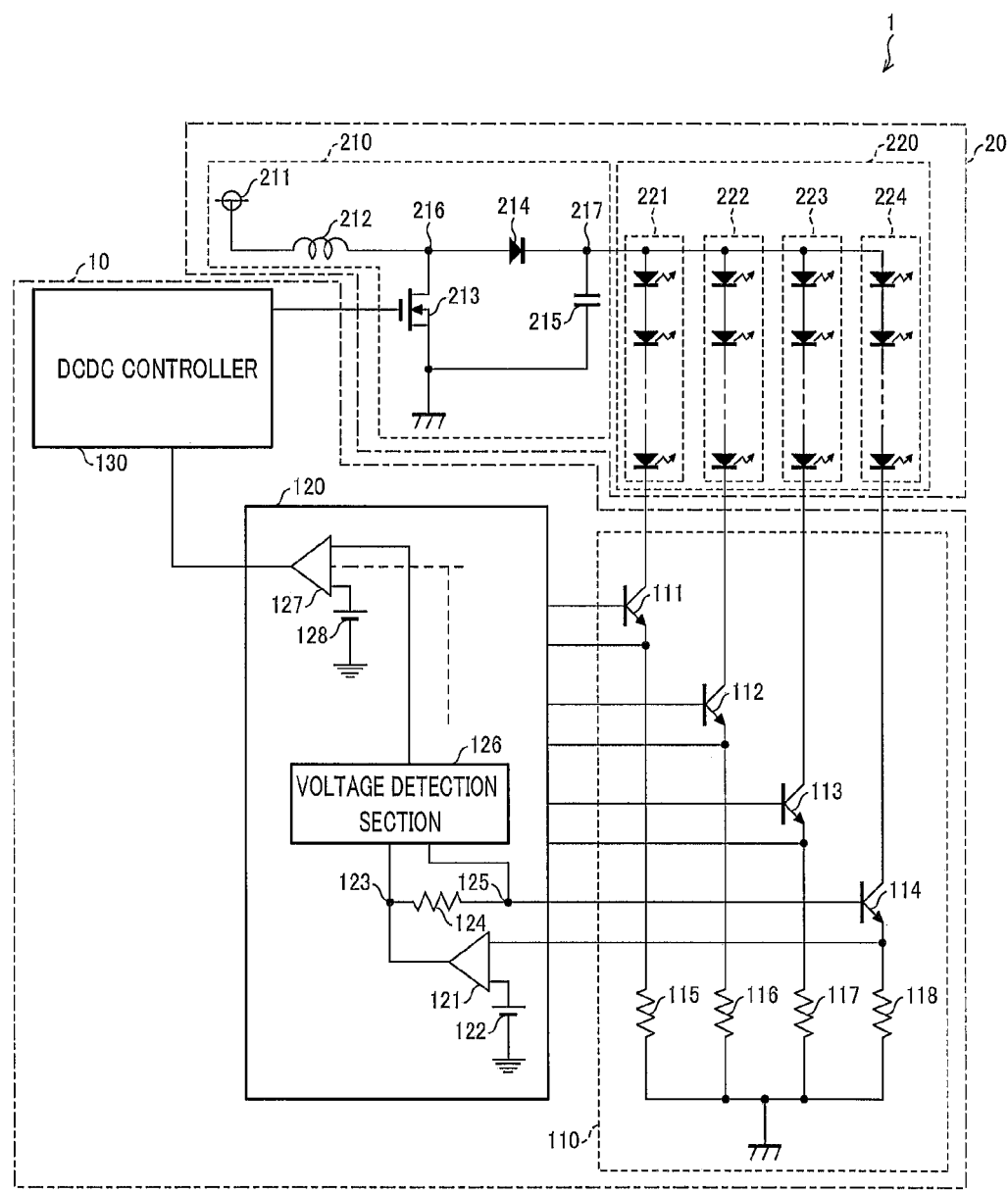
FIG. 1 is a circuit diagram illustrating a circuit of a light emitting device including an LED drive circuit in accordance with one embodiment of the present invention.

With reference to FIGS. 1 to 4, the following description will discuss an LED drive circuit, in accordance with Embodiment 1, for driving an LED which is a light emitting element. FIG. 1 is a circuit diagram illustrating a circuit configuration of a light emitting device including the LED drive circuit in accordance with Embodiment 1. In Embodiment 1, an example case will be described below in which the light emitting element is an LED. Note, however, that the present invention is not limited to such.

[Configuration of Light Emitting Device]

As illustrated in FIG. 1, a light emitting device 1 includes an LED drive circuit 10 and an LED light source circuit 20.

(Circuit Configuration of LED Light Source Circuit)

Initially, a circuit configuration of the LED light source circuit 20 will be described. As illustrated in FIG. 1, the LED light source circuit 20 includes a switching circuit 210 and an LED circuit 220.

The switching circuit 210 has (i) a function to switch between application and non-application of a drive voltage to the LED circuit 220 and (ii) a function to control the drive voltage to be applied to the LED circuit 220. As illustrated in FIG. 1, the switching circuit 210 can include a power source 211, a coil 212, a MOS transistor 213, a diode 214, and a capacitor 215.

The power source 211 is connected with an anode terminal 216 of the diode 214 via the coil 212. The MOS transistor 213 has (i) a drain terminal connected with the anode terminal 216 of the diode 214, (ii) a source terminal which is grounded, and (iii) a gate terminal connected with a DCDC controller 130. A cathode terminal 217 of the diode 214 is connected with the source terminal of the MOS transistor 213 via the capacitor 215 and is grounded.

The MOS transistor 213 is switched between an on-state and an off-state in response to a direct current voltage supplied from the DCDC controller 130. During the on-state, the MOS transistor 213 amplifies a voltage, supplied from the power source 211, in accordance with a gain which varies depending on the direct current voltage supplied from the DCDC controller 130.

The LED circuit 220 emits light in response to a drive voltage supplied from the switching circuit 210. As illustrated in FIG. 1, the LED circuit 220 can be made up of LED rows 221 through 224 each being composed of a plurality of LEDs connected in series.

According to each of the LED rows 221 through 224, (i) an anode terminal of an LED which is located at one end of a corresponding LED row (i.e., an LED whose anode terminal is not connected with other LED in the corresponding LED row) is connected with the cathode terminal 217 of the diode 214 in the switching circuit 210 and (ii) a cathode terminal of an LED which is located at the other end of the corresponding LED row (i.e., an LED whose cathode terminal is not connected with other LED in the corresponding LED row) is connected with a collector terminal of a corresponding one of the transistors 111 through 114 in a constant current driver 110 (mentioned later). Thus, the LED rows 221 through 224 are connected with each other in parallel.

Note that the plurality of LEDs in each of the LED rows 221 through 224 have variations in forward voltage drop. For example, forward voltage drop of white LEDs vary in a range of 3.4 V to 4 V. The LED rows 221 through 224 have thus respective different voltage drops.

(Configuration of LED Drive Circuit)

The following description will discuss a circuit configuration of the LED drive circuit 10. As illustrated in FIG. 1, the LED drive circuit 10 includes the constant current driver 110, an LED drive control section 120, and the DCDC controller 130.

Together with the later-described LED drive control section 120, the constant current driver 110 has a function (constant current function) to cause electric currents flowing through the respective LED rows 221 through 224 to be constant. As illustrated in FIG. 1, the constant current driver 110 can be configured by transistors 111 through 114 and resistors 115 through 118.

Each of collector terminals of the transistors 111 through 114 is connected with a cathode terminal of an LED which is located at the other end of the corresponding LED row (i.e., an LED whose cathode terminal is not connected with other LED in the corresponding LED row). Furthermore, base terminals of the transistors 111 through 114 are connected with the LED drive control section 120. Furthermore, emitter terminals of the transistors 111 through 114 are connected with the LED drive control section 120 and are grounded via the resistors 115 through 118, respectively.

The LED drive control section 120 has a function (low-loss control function) to control the DCDC controller 130 to lower loss in each of the transistors 111 through 114. Furthermore, together with the aforementioned constant current driver 110, the LED drive control section 120 has a constant current function to cause currents flowing through the respective LED rows 221 through 224 to be constant.

As illustrated in FIG. 1, the constant current function of the LED drive control section 120 is realized by an operational amplifier 121, a constant voltage source 122, and a resistor 124. One input terminal of the operational amplifier 121 is connected with a collector terminal of the transistor 114, the other input terminal of the operational amplifier 121 is connected with the constant voltage source 122, and an output terminal of the operational amplifier 121 is connected with a base terminal of the transistor 114 via the resistor 124.

The LED drive control section 120 has four pairs of input terminals, each pair of which is to be connected with an emitter terminal and a base terminal of a corresponding one of the transistors 111 through 114. Each of the four pairs of input terminals is connected with the operational amplifier 121, the constant voltage source 122, and the resistor 124 (not shown except for the pair connected with the transistor 114).

The low-loss control function of the LED drive control section 120 is realized by a voltage detection section 126, a comparison circuit 127, and a constant voltage source 128. The voltage detection section 126 is connected with both ends (terminals 123 and 125) of the resistor 124, and detects a dropping voltage across the resistor 124. That is, the voltage detection section 126 detects a voltage which is proportional to a base current of the transistor 114. The voltage detected by the voltage detection section 126 is supplied to the comparison circuit 127.

Note that the LED drive control section 120 has four voltage detection sections 126 which detect voltages proportional to base currents of the transistors 111 through 114, respectively (not shown except for the voltage detection section 126 which detects a voltage proportional to a base current of the transistor 114). Voltages detected by the respective four voltage detection sections 126 are supplied to the comparison circuit 127.

The comparison circuit 127 samples voltages supplied from the respective four voltage detection sections 126 with respect to each sampling clock. Then, the comparison circuit 127 compares a maximum voltage Vmax out of the sampled four voltages with a reference voltage Vref supplied from the constant voltage source 128. The comparison circuit 127 supplies, to the DCDC controller 130, a DCDC instruction signal which varies depending on a result of the comparison. To be more specific, (i) in a case where the maximum voltage Vmax is larger than the reference voltage Vref at a current sampling clock, the DCDC instruction signal at the current sampling clock is set to be larger by one stage than the DCDC instruction signal at a previous sampling clock, whereas (ii) in a case where the maximum voltage Vmax is smaller than the reference voltage Vref at the current sampling clock, the DCDC instruction signal at the current sampling clock is set to be smaller by one stage than the DCDC instruction signal at the previous sampling clock. It should be noted that a lower limit is set to the DCDC instruction signal. Specifically, even in a case where the maximum voltage Vmax continues to be smaller than the reference voltage Vref, the DCDC instruction signal does not get smaller than the lower limit.

Figure 2:
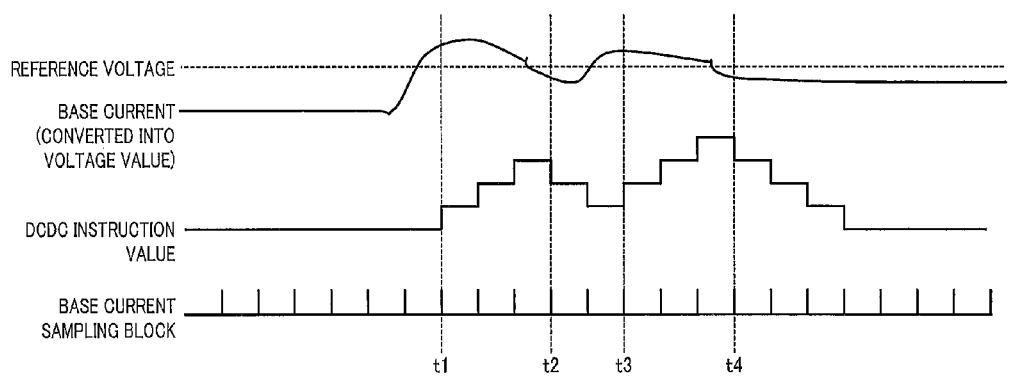
FIG. 2 is a timing chart illustrating an operation example of a comparison circuit included in a light emitting device in accordance with one embodiment of the present invention.

FIG. 2 illustrates an example setting of the DCDC instruction signal ("base current" (converted into voltage value)" in FIG. 2 corresponds to the maximum voltage Vmax). In the example illustrated in FIG. 2, the maximum voltage Vmax is larger than the reference voltage Vref at and after a sampling clock t1. Accordingly, the comparison circuit 127 increases the DCDC instruction signal ("DCDC instruction value" in FIG. 2) by one stage with respect to each sampling clock. In contrast, the maximum voltage Vmax is smaller than the reference voltage Vref at and after a clock t2. Accordingly, the comparison circuit 127 decreases the value of the DCDC instruction signal by one stage with respect to each sampling clock. Subsequently, at and after a sampling clock t3, the maximum voltage Vmax is larger than the reference voltage Vref again. Accordingly, the comparison circuit 127 increases again the DCDC instruction signal by one stage with respect to each sampling clock. Then, at and after a sampling clock t4, the maximum voltage Vmax is smaller than the reference voltage Vref again. Accordingly, the comparison circuit 127 decreases again the DCDC instruction signal by one stage with respect to each sampling clock.

In accordance with the DCDC instruction signal which the DCDC controller 130 has received from the comparison circuit 127, the DCDC controller 130 controls a voltage to be applied to the switching circuit 210. Specifically, as the DCDC instruction signal is larger, the DCDC controller 130 increases a direct current voltage to be applied to the MOS transistor 213, whereas as the value of the received DCDC instruction signal is smaller, the DCDC controller 130 decreases the direct current voltage to be applied to the MOS transistor 213.

A description was provided above as to a case where the DCDC instruction signal is increased/decreased by one stage at a sampling clock at which the maximum voltage Vmax is larger/smaller than the reference voltage Vref. Embodiment 1 is, however, not limited to such. For example, an alternative circuit configuration can be employed in which, at a sampling clock at which the maximum voltage Vmax is larger/smaller than the reference voltage Vref, the DCDC instruction signal is increased/decreased by two stages or increased/decreased by three stages.

In the aforementioned example, the maximum voltage Vmax is compared with the reference voltage Vref at each sampling clock and the DCDC instruction signal is increased or decreased with respect to each sampling clock. Embodiment 1 is not limited to such. For example, an alternative configuration can be employed in which the maximum voltage Vmax is compared with the reference voltage Vref for every two clocks and the DCDC instruction signal is changed for every two sampling clocks or an alternative a configuration can be employed in which the maximum voltage Vmax is compared with the reference voltage Vref for every three clocks and the DCDC instruction signal is changed for every three clocks.

In the above example, a description was focused on a circuit configuration in which the maximum voltage Vmax which is the largest of four voltages obtained by sampling voltages supplied from the respective four voltage detection sections 126. The present invention is, however, not limited to such a configuration. For example, an alternative circuit configuration can be employed in which each of the four voltages is compared with the reference voltage Vref and in a case where at least one of the four voltages is larger than the reference voltage Vref, the DCDC instruction signal is increased by one stage, whereas in a case where all of the four voltages are smaller than the reference voltage Vref, the DCDC instruction signal is decreased by one stage.

In the present embodiment, a description was provided above as to an example in which the LED drive control section 120 includes four pairs of terminals to be connected with LED rows via the constant current driver 110 (hereinafter, a pair of terminals to be connected with a corresponding one of the transistors 111 through 114 is also called a "channel"), i.e. an example in which the LED drive control section 120 includes four channels. Needless to say, the present invention is not limited to this case, and the LED drive control section 120 may include ten channels for example.

The DCDC controller 130 adjusts a voltage to be applied to the switching circuit 210 so that a voltage ΔV supplied from the comparison circuit 127 of the LED drive control section 120 becomes zero (0).

[Low-loss Control Function of LED Drive Circuit]

The following description will discuss the low-loss control function of the LED drive control section 120 in some more detail.

As has been described, the voltage detection section 126 of the LED drive control section 120 detects a voltage V which is proportional to a base current of the transistor 114. According to the transistor 114, as a collector-emitter voltage Vce is smaller, the base current is larger, whereas as the collector-emitter voltage Vce is larger, the base current is smaller. Consequently, the voltage detection section 126 detects a voltage V (Vce) which is negatively related to the collector-emitter voltage Vce of the transistor 114.

As has been described, the comparison circuit 127 of the LED drive control section 120 sets the DCDC instruction signal in accordance with the result of comparison between (i) the maximum voltage Vmax out of voltages supplied from the respective voltage detection sections and (ii) the reference voltage Vref supplied from the constant voltage source 128. Furthermore, as has been described, in accordance with the DCDC instruction signal supplied from the comparison circuit 127 of the LED drive control section 120, the DCDC controller 130 controls a direct current voltage to be supplied to the switching circuit 210.

The reference voltage Vref is set to be a little smaller than a voltage V (Vceo), where Vceo is a collector-emitter voltage obtained when each of the transistors 111 through 114 changes from a saturation region to an active region. This allows the minimum voltage out of collector-emitter voltages Vce of the respective transistors 111 through 114 to be kept at a value a little larger than Vceo. That is, this allows the transistors 111 through 114 to operate in their respective active regions so as to achieve their respective constant current operations.

With the arrangement, the LED drive control section 120 can detect voltages corresponding to the collector voltages from respective base currents of the transistors 111 through 114, instead of directly detecting collector voltages of the respective transistors 111 through 114.

With the arrangement, the LED drive control section 120 can carry out a low-loss control function, instead of referring to voltages of the collector terminals of the respective transistors 111 through 114. This allows a reduction in the number of input terminals, and allows circuit size to be downsized. Furthermore, since it is unnecessary for the LED drive control section 120 to refer to voltages of the collector terminals of the respective transistors 111 through 114 which voltages can be high, it is unnecessary for the LED drive control section 120 to have a high withstand voltage.

Furthermore, with the arrangement, it is easy to add an LED row(s) to the LED circuit 220. The following description will discuss, as a modification of the light emitting device 1 in accordance with Embodiment 1, a light emitting device in which an LED row is added to the LED circuit 220.

Figure 3:
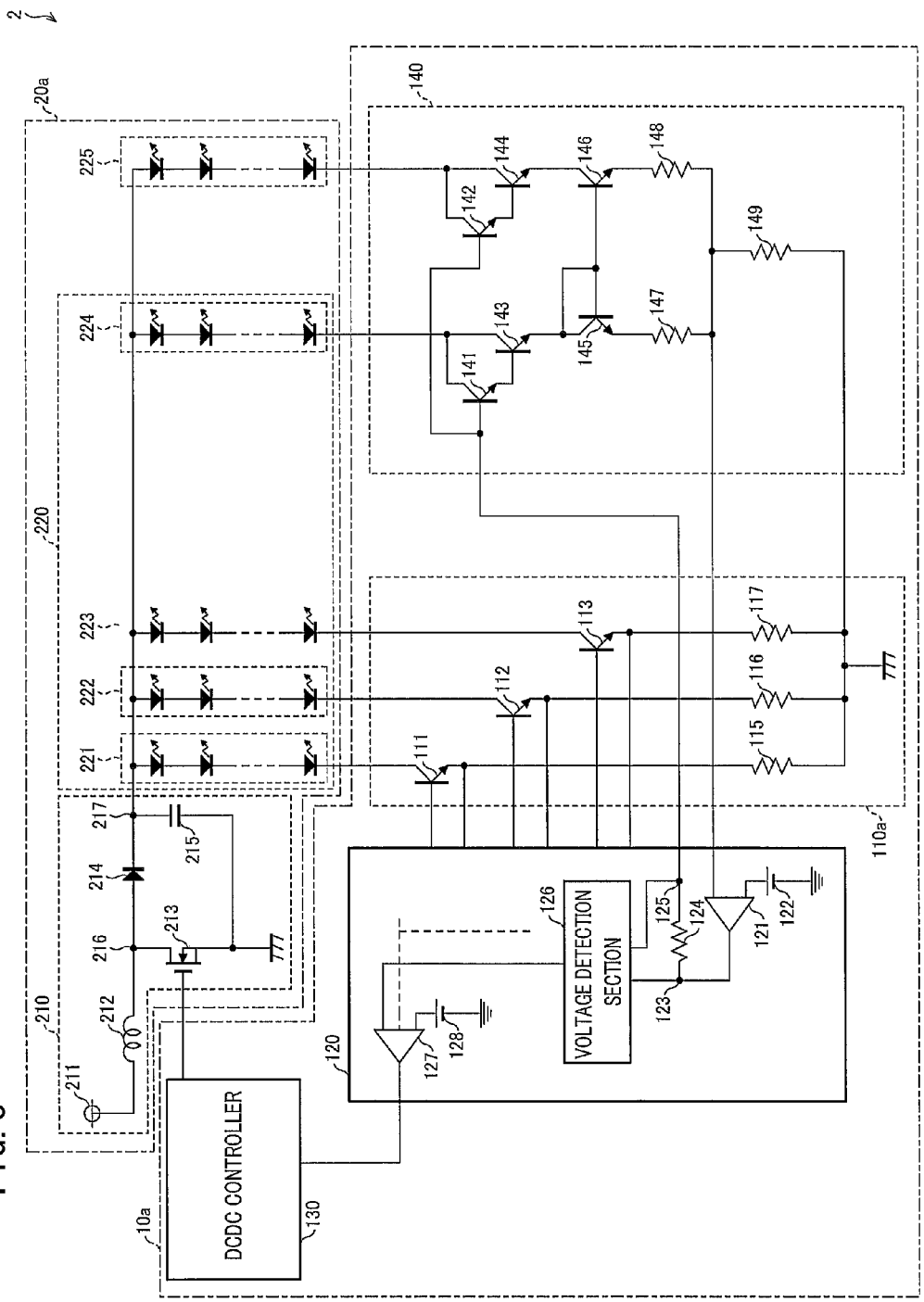
FIG. 3 is a circuit diagram illustrating a circuit of a light emitting device including an LED drive circuit in accordance with a modification example of one embodiment of the present invention.

FIG. 3 is a circuit diagram illustrating a circuit of a light emitting device including an LED drive circuit in accordance with the present modification. As illustrated in FIG. 3, a light emitting device in accordance with the present embodiment is the same as the light emitting device 1 in accordance with Embodiment 1 except that (i) an LED drive circuit 10a further includes a current mirror circuit 140 and (ii) an LED light source circuit 20a includes an LED row 225.

According to the present modification, as illustrated in FIG. 3, the LED row 225 is added to the LED light source circuit 20a so that there are five LED rows in the LED light source circuit 20a.

However, since the LED drive control section 120 has only four channels to be connected with LED rows, simple addition of the LED row 225 will not allow the LED row 225 to be driven.

In order to connect the LED row 225 with the LED drive control section 120, the LED drive circuit 10 further includes the current mirror circuit 140.

(Configuration of Current Mirror Circuit)

Figure 4:
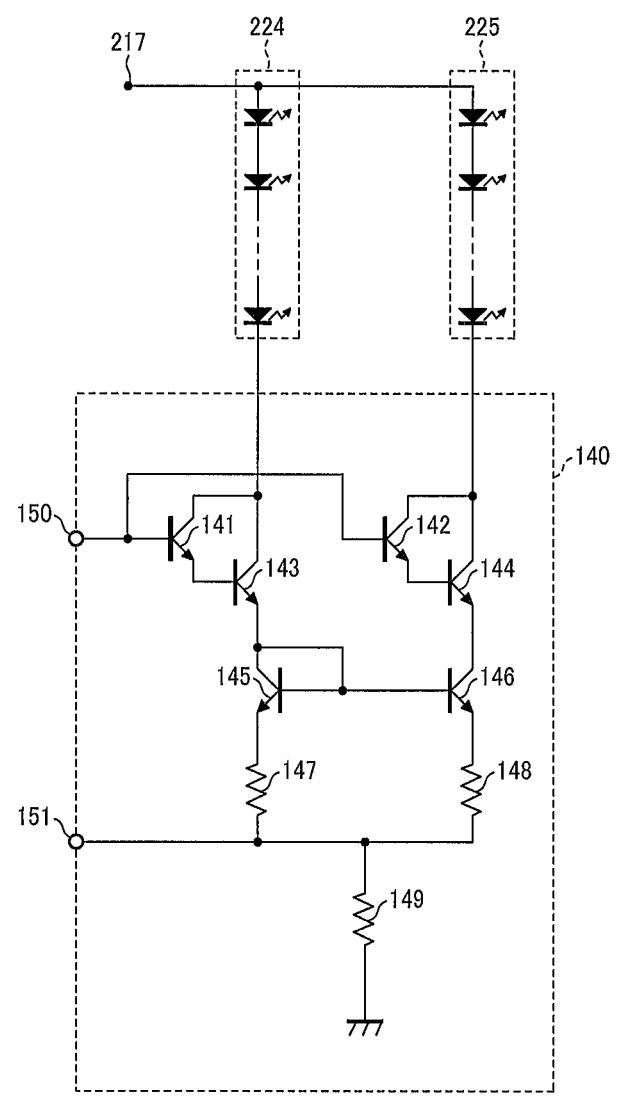
FIG. 4 is a circuit diagram illustrating a current mirror circuit included in an LED drive circuit in accordance with a modification example of one embodiment of the present invention.

With reference to FIG. 4, the following description will discuss a circuit configuration of the current mirror circuit 140 in accordance with the present modification. FIG. 4 is a circuit diagram illustrating the current mirror circuit 140 included in the LED drive circuit 10a in accordance with the present modification.

As illustrated in FIG. 4, the current mirror circuit 140 includes transistors 141 through 146 and resistors 147 through 149. A constant current driver 110a in accordance with the present modification is provided with the current mirror circuit 140 in FIG. 4 instead of the transistor 114 and the resistor 118 which are included in the constant current driver 110 in accordance with Embodiment 1. This allows for addition of the LED row 225.

The transistors 141 and 143 are Darlington-connected with each other in such a way that a collector terminal of the transistor 141 is connected with a collector terminal of the transistor 143 and an emitter terminal of the transistor 141 is connected with a base terminal of the transistor 143. Furthermore, the collector terminals of the transistors 141 and 143 are connected with a cathode terminal of an LED row 224, a base terminal of the transistor 141 is connected with a base output terminal 150, and an emitter terminal of the transistor 143 is connected with a collector terminal of the transistor 145.

The transistors 142 and 144 are Darlington-connected with each other in such a way that a collector terminal of the transistor 142 is connected with a collector terminal of the transistor 144 and an emitter terminal of the transistor 142 is connected with a base terminal of the transistor 144. Furthermore, the collector terminals of the transistors 142 and 144 are connected with a cathode terminal of the LED row 225, a base terminal of the transistor 142 is connected with the base output terminal 150, and an emitter terminal of the transistor 144 is connected with a collector terminal of the transistor 146.

The transistors 145 and 146 form a current mirror circuit in which a collector terminal of the transistor 145 is connected with a base terminal of the transistor 145 and a base terminal of the transistor 146. The collector terminal of the transistor 145 is connected with the emitter terminal of the transistor 143, and the emitter terminal of the transistor 145 is connected with one end of the resistor 147. The collector terminal of the transistor 146 is connected with the emitter terminal of the transistor 144, and the emitter terminal of the transistor 146 is connected with one end of the resistor 148.

Note that, when considering, as being individual transistors, the Darlington pair formed by the transistors 141 and 143 and the Darlington pair formed by the transistors 142 and 144, the transistors 141 through 146 are connected so as to form a Wilson current mirror (improved Wilson current mirror) circuit.

Since the current mirror circuit 140 is a Wilson current mirror formed by transistors each consisting of a pair of transistors, the current mirror circuit 140 can maintain a constant current operation with higher accuracy.

Each of the other ends of the resistors 147 and 148 is connected with one end of the resistor 149 and an emitter output terminal 151, and the other end of the resistor 149 is grounded.

The base output terminal 150 is a terminal via which an electric current to flow through the transistors 141 and 142 is supplied. The emitter output terminal 151 is a terminal via which emitter voltages of the respective transistors 145 and 146, connected with the emitter output terminal 151 via the resistors 147 and 148, respectively, are outputted.

The current mirror circuit 140 forms a so-called emitter follower circuit so that the current mirror circuit 140 can maintain a constant current operation even in a case where different voltages Vf are applied on the respective LED rows 224 and 225.

In the present embodiment, the current mirror circuit 140 has a circuit configuration in which a pair of transistors is Darlington-connected with a Wilson current mirror circuit consisting of two pairs of transistors. However, the present invention is not limited to this circuit configuration. There may be employed a circuit configuration in which a pair of transistors is Darlington-connected with a Widlar current mirror circuit consisting of a pair of transistors. Employing the latter circuit configuration would be more advantageous than employing the former circuit configuration in terms of simplicity in circuit configuration.

[Control Operation of LED Drive Circuit]

With reference to FIG. 3, the following description will discuss a control operation of the LED drive circuit 10a including the current mirror circuit 140. Note that a base terminal (base output terminal 150 illustrated in FIG. 4) shared by the transistors 141 and 142 is also referred to as a base terminal of the current mirror circuit 140. Note also that an emitter terminal (emitter output terminal 151 in FIG. 4) connected with the transistors 145 and 146 via the resistors 147 and 148, respectively, is also referred to as an emitter terminal of the current mirror circuit 140.

(Low-loss Control Function of LED Drive Circuit)

The following description will discuss a low-loss control function of the LED drive control section 120 in more detail.

As has been described, the voltage detection section 126 of the LED drive control section 120 detects a voltage V which is proportional to a base current flowing through the base terminal of the current mirror circuit 140. In the current mirror circuit 140, as collector-emitter voltages Vce of the transistors 145 and 146 are smaller, the base current of the current mirror circuit 140 is larger, whereas as the respective collector-emitter voltages Vce of the transistors 145 and 146 are larger, the base current of the current mirror circuit 140 is smaller. Therefore, the voltage detection section 126 detects a voltage V (Vce) which is negatively related to the respective collector-emitter voltages Vce of the transistors 145 and 146 of the current mirror circuit 140.

As has been described, the comparison circuit 127 of the LED drive control section 120 sets the DCDC instruction signal in accordance with the result of comparison between (i) the maximum voltage Vmax out of voltages supplied from the respective voltage detection sections and (ii) the reference voltage Vref supplied from the constant voltage source 128. Furthermore, as has been described, in accordance with the DCDC instruction signal supplied from the comparison circuit 127 of the LED drive control section 120, the DCDC controller 130 controls a direct current voltage to be supplied to the switching circuit 210.

The reference voltage Vref is set to be a little smaller than a voltage V (Vceo), where Vceo is a collector-emitter voltage obtained when each of the transistors 111 through 113 and the transistors 145 and 146 of the current mirror circuit 140 changes from a saturation region to an active region. This allows the minimum voltage out of collector-emitter voltages Vce of the respective transistors 111 through 113 and the respective transistors 145 and 146 of the current mirror circuit 140 to be kept at a value a little larger than Vceo. That is, this allows the transistors 111 through 113 and the transistors 145 and 146 of the current mirror circuit 140 to operate in their respective active regions so as to achieve their respective constant current operations.

With the arrangement, the LED drive control section 120 can detect voltages corresponding to the collector voltages from respective base currents of the transistors 111 through 114, instead of directly detecting collector voltages of the respective transistors 111 to 114.

By employing the circuit configuration, in a case of an addition of an LED row in parallel to the LED rows 221 through 224 connected in parallel, it is possible to easily make such an addition by connecting a circuit including two or more switching elements sharing a base current. This is because the sharing of a base terminal between the newly provided switching elements makes it unnecessary for the comparison circuit to have a new connection terminal to be connected with the base terminal of the newly provided switching elements, thereby eliminating the necessity of adding a new comparison circuit.

Since it is unnecessary to add a new comparison circuit, it is possible to keep down an increase in circuit size and to reduce costs for addition of a new comparison circuit even in a case where a light emitting element is added.

Embodiment 2

Figure 5:
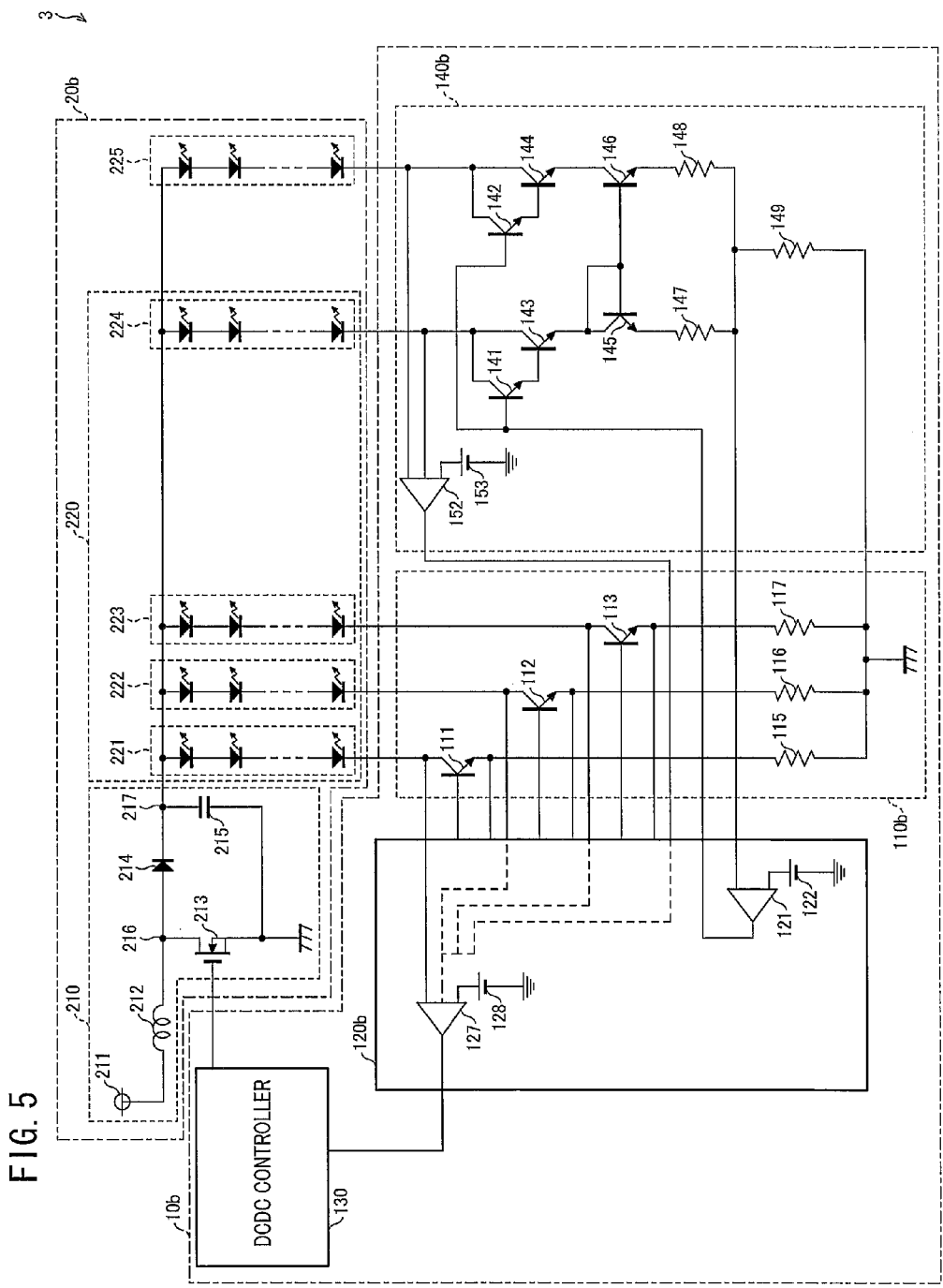
FIG. 5 is a circuit diagram illustrating a circuit of a light emitting device including an LED drive circuit in accordance with another embodiment of the present invention.
Figure 6:
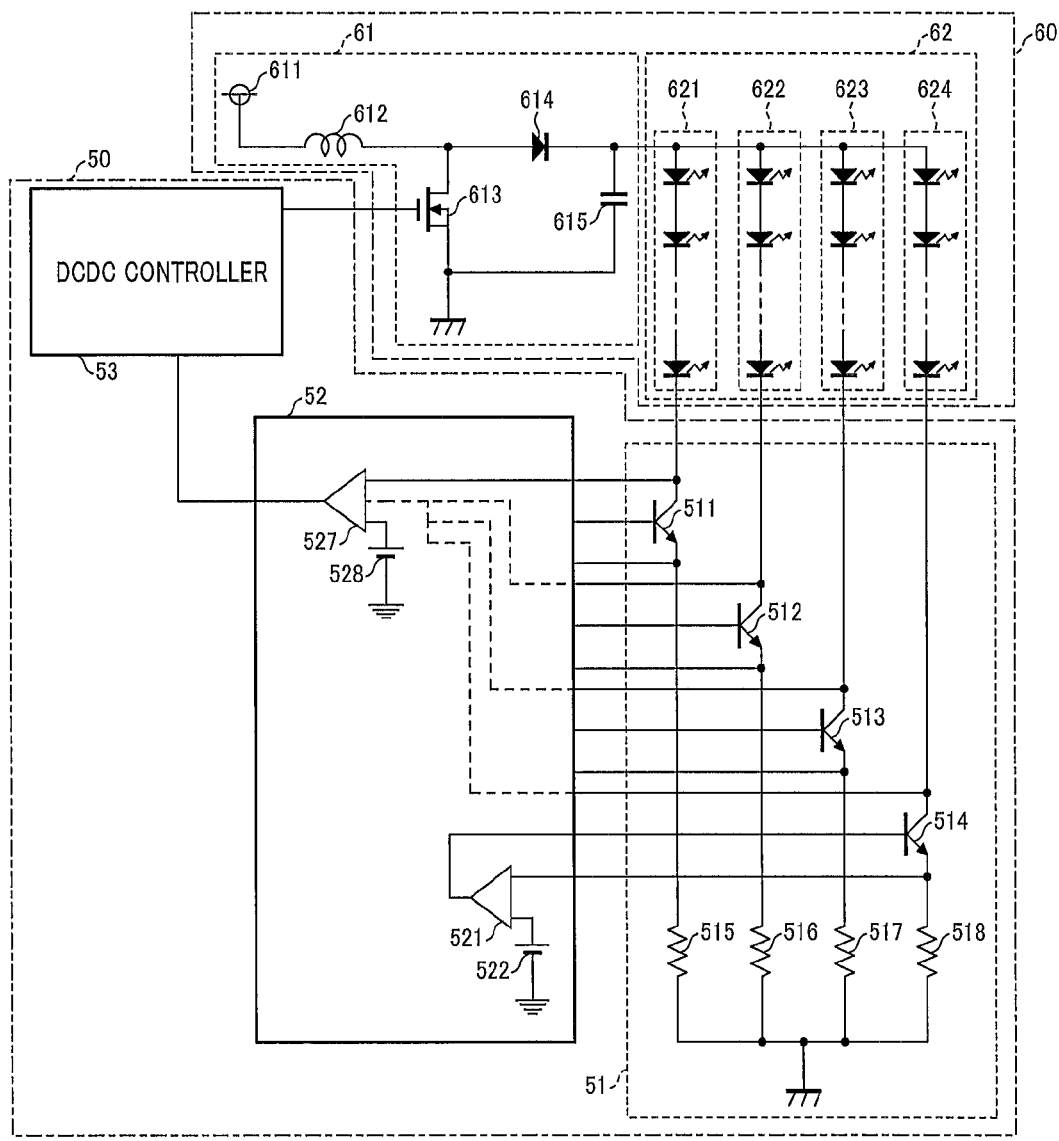
FIG. 6 is a circuit diagram illustrating a light emitting device of Patent Literature 1.
Figure 7:
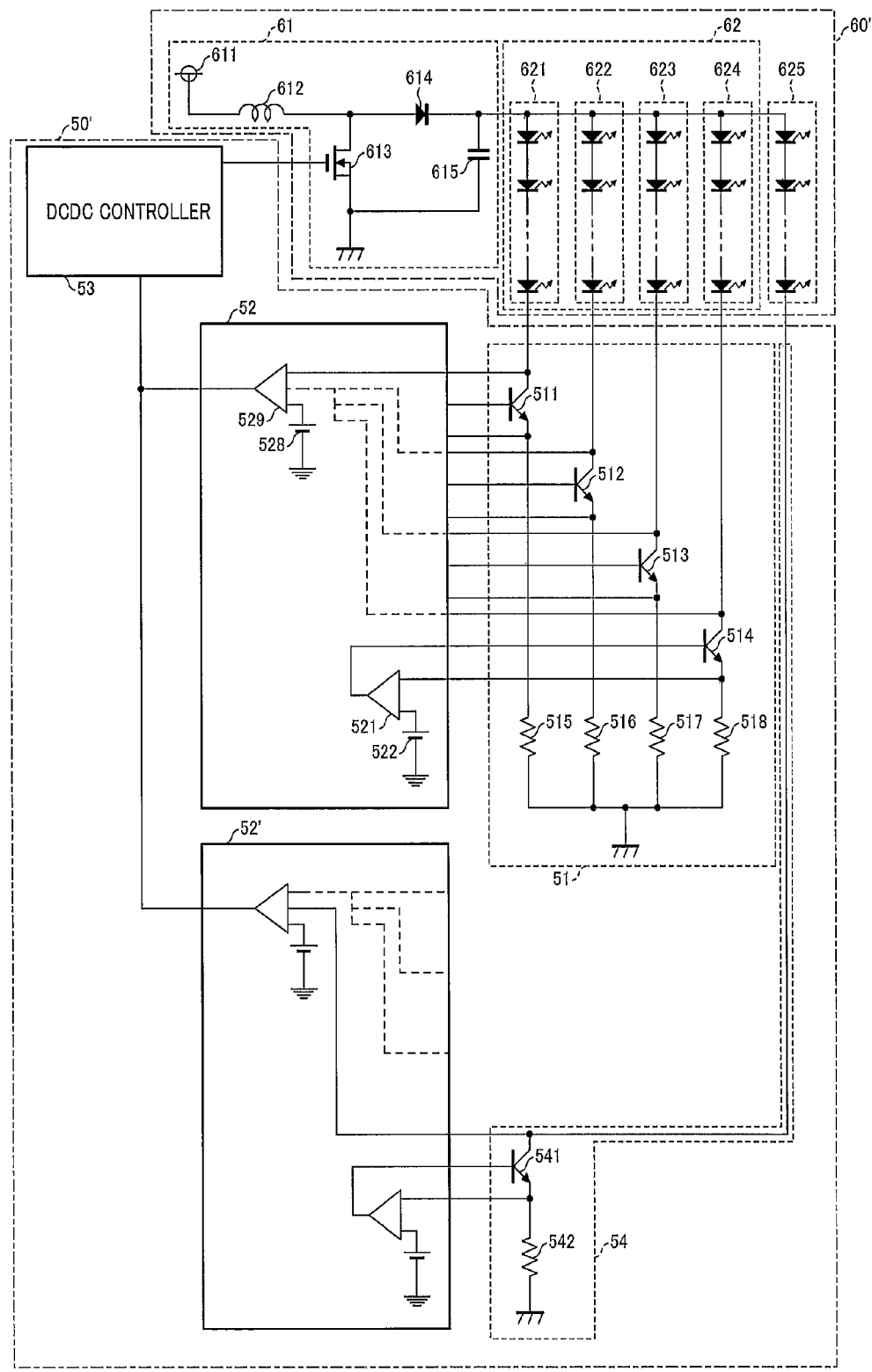
FIG. 7 is a circuit diagram illustrating a circuit of a light emitting device in a case where an LED row is added with use of an LED drive control section described in Patent Literature 1.

The following description will discuss Embodiment 2 of the present invention with reference to FIG. 5. Note that, for convenience, members having the same functions as those in Embodiment 1 are given the same reference numerals and description thereof are omitted. In Embodiment 2, a description will be mainly focused on differences between Embodiment 1 and Embodiment 2.

[Circuit Configuration of Light Emitting Device]

FIG. 5 is a circuit diagram illustrating a circuit configuration of a light emitting device including an LED drive circuit in accordance with Embodiment 2 of the present invention. As illustrated in FIG. 5, a light emitting device 3 in accordance with the present embodiment is the same as the light emitting device 2 in accordance with Embodiment 2, except that an LED drive circuit 10*b* includes an LED drive control section 120*b* and a current mirror circuit 140*b*.

In Embodiment 2, as illustrated in FIG. 5, the LED drive control section 120*b* has collector connection terminals connected with collector terminals of transistors connected with cathode terminals of respective LED rows 221 through 223 of the LED light source circuit 20*b*. The LED drive control section 120*b* acquires collector-emitter voltages of the transistors via the respective collector connection terminals.

The comparison circuit 127 compares collector-emitter voltages Vce supplied from the respective transistors. Then, the comparison circuit 127 supplies, to a DCDC controller 130, a DCDC instruction signal which varies depending on the result of comparison between (i) the maximum voltage Vmax out of the compared collector-emitter voltages Vce and (ii) a reference voltage Vref supplied from a constant voltage source 128.

(Configuration of Current Mirror Circuit)

As illustrated in FIG. 5, the current mirror circuit 140*b* includes transistors 141 through 146, resistors 147 through 149, a comparison circuit 152, and a constant voltage source 153. A constant current driver 110*b* in accordance with Embodiment 2 is provided with the current mirror circuit 140*b*, instead of the transistor 114 and the resistor 118 which are included in the constant current driver 110 in accordance with Embodiment 1, thereby allowing an LED row 225 to be added.

The transistors 141 and 143 are Darlington-connected with each other in such a way that a collector terminal of the transistor 141 is connected with a collector terminal of the transistor 143 and an emitter terminal of the transistor 141 is connected with a base terminal of the transistor 143. Furthermore, the collector terminals of the transistors 141 and 143 are connected with a cathode terminal of an LED row 224, a base terminal of the transistor 141 is connected with a base output terminal 150, and an emitter terminal of the transistor 143 is connected with a collector terminal of the transistor 145.

The transistors 142 and 144 are Darlington-connected with each other in such a way that a collector terminal of the transistor 142 is connected with a collector terminal of the transistor 144 and an emitter terminal of the transistor 142 is connected with a base terminal of the transistor 144. Furthermore, the collector terminals of the transistors 142 and 144 are connected with a cathode terminal of the LED row 225, a base terminal of the transistor 142 is connected with the base output terminal 150, and an emitter terminal of the transistor 144 is connected with a collector terminal of the transistor 146.

The transistors 145 and 146 form a current mirror circuit in which a collector terminal of the transistor 145 is connected with a base terminal of the transistor 145 and a base terminal of the transistor 146. The collector terminal of the transistor 145 is connected with the emitter terminal of the transistor 143, and the emitter terminal of the transistor 145 is connected with one end of the resistor 147. The collector terminal of the transistor 146 is connected with the emitter terminal of the transistor 144, and the emitter terminal of the transistor 146 is connected with one end of the resistor 148.

Furthermore, when considering, as being individual transistors, the Darlington pair formed by the transistors 141 and 143 and the Darlington pair formed by the transistors 142 and 144, the transistors 141 through 146 are connected so to form a Wilson current mirror (improved Wilson current mirror) circuit.

Each of the other ends of the resistors 147 and 148 is connected with one end of the resistor 149 and an emitter output terminal 151, and the other end of the resistor 149 is grounded.

Furthermore, a first input terminal of the comparison circuit 152 is connected with the collector terminal of the transistor 141, a second input terminal of the comparison circuit 152 is connected with the collector terminal of the transistor 142, and a third input terminal of the comparison circuit 152 is connected with the constant voltage source 153, and an output terminal of the comparison circuit 152 is connected with the collector connection terminal of the LED drive control section 120*b*.

The comparison circuit 152 compares a voltage at the collector terminal of the transistor 143 (voltage between the collector terminal of the transistor 143 and the emitter terminal of the transistor 145) with a voltage at the collector terminal of the transistor 144 (voltage between the collector terminal of the transistor 144 and the emitter terminal of the transistor 146), and supplies a larger one of the two voltages to the LED drive control section 120*b*.

[Low-Loss Control Function of LED Drive Circuit]

The following description will discuss a low-loss control function of the LED drive control section 120*b* in some more detail.

As has been described, the comparison circuit 127 of the LED drive control section 120*b* sets the DCDC instruction signal in accordance with the result of comparison of the maximum voltage Vmax out of the voltage supplied from the comparison circuit 152 and the collector-emitter voltages Vce of the transistors 111 through 113 with the reference voltage Vref supplied from the constant voltage source 128. Furthermore, as has been described, in accordance with the DCDC instruction signal supplied from the comparison circuit 127 of the LED drive control section 120, the DCDC controller 130 controls a direct current voltage to be supplied to the switching circuit 210.

The reference voltage Vref is set to be a little smaller than a voltage V (Vceo), where Vceo is a collector-emitter voltage obtained when each of the transistors 111 through 113 and 141 through 146 changes from a saturation region to an active region. This allows the minimum voltage out of respective collector-emitter voltages Vce of the transistors 111 to 113 and 141 to 146 to be kept at a value a little larger than Vceo. That is, this allows the transistors 111 through 113 and 141 through 146 to operate in their active regions so as to achieve their respective constant current operations.

With the arrangement, the LED drive control section 120 can detect voltages corresponding to the collector voltages from respective base currents of the transistors 111 through 114, instead of directly detecting collector voltages of the transistors 111 to 114.

(Additional Matter 1)

As has been described, a light emitting element drive circuit of the present invention is a light emitting element drive circuit for driving a light emitting element circuit in which a plurality of light emitting elements are connected with each other in parallel, the light emitting element drive circuit including: a constant current driver including a plurality of transistors whose collector terminals are connected with the respective plurality of light emitting elements and whose emitter terminals are grounded; and a control circuit for setting a voltage, to be commonly applied to the plurality of light emitting elements, in accordance with a maximum base current out of base currents of the respective plurality of transistors.

With the arrangement, the control circuit can realize a low-loss control function without referring to voltages of the collector terminals of the respective transistors. This allows reducing the number of input terminals and downsizing circuit size. Furthermore, since it is unnecessary for the control circuit to refer to voltages of collector terminals of the respective transistors which voltages can be high, it is unnecessary for the control circuit to have a high withstand voltage.

With the arrangement, addition of a light emitting element in parallel to the light emitting elements connected in parallel can be easily made by connecting a circuit including two or more switching elements sharing a base current. This is because the sharing of a base terminal between the newly provided switching elements makes it unnecessary for the control circuit to have a new connection terminal to be connected with the base terminal of the newly provided switching elements, thereby eliminating the necessity of adding a new comparison circuit.

Since it is unnecessary to add a new control circuit, it is possible to keep down an increase in circuit size and to reduce costs for addition of a new control circuit in a case where the light emitting element is added.

It is preferable to arrange the light emitting element drive circuit of the present invention so as to further include a current mirror circuit for flowing identical currents through (i) the light emitting element included in the light emitting element circuit and (ii) an additional light emitting element connected in parallel with the light emitting element, the control circuit setting a voltage, to be commonly applied to the plurality of light emitting elements, in accordance with a maximum base current out of (a) the base currents of the respective plurality of transistors and (b) a base current flowing through base terminals, which are connected with each other, of a pair of transistors included in the current mirror circuit.

With the arrangement, the current mirror circuit can flow, through the light emitting element connected in parallel with said one of the plurality of light emitting elements, a current substantially equal to a current flowing through said one of the plurality of light emitting elements. Furthermore, the comparison circuit acquires a base current flowing through the base terminals, which are connected with each other, of the pair of transistors, thereby allowing for addition of a light emitting element without increasing the number of a base terminal for acquiring a base current.

It is preferable to arrange the light emitting element drive circuit of the present invention such that the current mirror circuit is a Wilson current mirror circuit.

With the arrangement, since the current mirror circuit is a Wilson current mirror circuit, it is possible to reduce a change in properties of the current mirror circuit due to a temperature. This allows (i) a current flowing through the light emitting element connected in parallel with said one of the plurality of light emitting elements and (ii) a current flowing through said one of the plurality of light emitting elements to be substantially equal to each other with higher exactness.

It is preferable to arrange the light emitting element drive circuit of the present invention such that the current mirror circuit is a Widlar current mirror circuit.

With the arrangement, since the current mirror circuit is a Widlar current mirror circuit, it is possible to simplify a circuit configuration, thereby realizing a light emitting element drive circuit which can be produced with lower costs.

It is preferable to arrange the light emitting element drive circuit of the present invention such that the current mirror circuit further includes another pair of transistors which are Darlington-connected with the pair of transistors.

With the arrangement, a current to be supplied to the pair of transistors whose base terminals are connected with each other can be amplified by another pair of transistors which are Darlington-connected with the pair of transistors. This allows reducing a current supplied from the control circuit to drive the pair of transistors whose base terminals are connected with each other and which constitute the current mirror. Thus, power consumption can be reduced.

The current mirror circuit in which another pair of transistors is Darlington-connected with the pair of transistors may be a Widlar current mirror circuit consisting of a pair of transistors or may be a Wilson current mirror circuit consisting of two pairs of transistors. The former circuit allows for a simple and inexpensive light emitting element drive circuit. The latter circuit allows for a light emitting element drive circuit with higher exactness.

As has been described, a method of the present invention of adding an additional light emitting element is a method for adding an additional light emitting element to a light emitting element circuit in which a plurality of light emitting elements are connected with each other in parallel, the method including the step of: connecting one of the plurality of light emitting elements with the additional light emitting element with use of a current mirror circuit which flows identical currents through the additional light emitting element and said one of the plurality of light emitting elements.

With the arrangement, addition of an additional light emitting element in parallel to the light emitting elements connected in parallel is made with use of the current mirror. This allows flowing identical currents through the additional light emitting element and one of the plurality of light emitting elements, thereby allowing for easy addition of the additional light emitting element.

(Additional Matter 2)

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The light emitting element drive circuit of the present invention is preferably applicable to light sources of illumination equipment and backlights of displays of television receivers, mobile phones etc.

REFERENCE SIGNS LIST 1, 2, 3 Light emitting device
10, 10a, 10b LED drive circuit
20, 20a, 20b LED light source circuit
110, 110a, 110b Constant current driver
111-114, 141-146 Transistor
115-117, 124, 147-149 Resistor
120, 120b LED drive control section
121, 127, 152 Comparison circuit
122, 128, 153 Constant voltage source
126 Voltage detection section
130 DCDC controller
210 Switching circuit
211 Power source
212 Coil
213 MOS transistor
214 Diode
215 Capacitor
220 LED circuit
221-225 LED row

The invention claimed is:

1. A light emitting element drive circuit for driving a light emitting element circuit in which a plurality of light emitting elements are connected with each other in parallel, the light emitting element drive circuit comprising:

a constant current driver including a plurality of transistors whose collector terminals are connected with the respective plurality of light emitting elements and whose emitter terminals are grounded;

a control circuit for setting a voltage, to be commonly applied to the plurality of light emitting elements, in accordance with a maximum base current out of base currents of the respective plurality of transistors; and a current mirror circuit for flowing identical currents through (i) the light emitting element included in the light emitting element circuit and (ii) an additional light emitting element connected in parallel with the light emitting element, the control circuit being not connected with any of the collector terminals of the respective plurality of transistors and collector terminals of a pair of transistors included in the current mirror circuit, the control circuit being connected with the emitter terminals of the respective plurality of transistors and emitter terminals of the pair of transistors included in the current mirror circuit, and the control circuit setting a voltage, to be commonly applied to the plurality of light emitting elements, in accordance with a maximum base current out of (a) the base currents of the respective plurality of transistors and (b) a base current flowing through base terminals, which are connected with each other, of the pair of transistors included in the current mirror circuit.

2. The light emitting element drive circuit as set forth in claim 1, wherein the current mirror circuit is a Wilson current mirror circuit.

3. The light emitting element drive circuit as set forth in claim 1, wherein the current mirror circuit is a Widlar current mirror circuit.

4. The light emitting element drive circuit as set forth in claim 1, wherein the current mirror circuit further includes another pair of transistors which are Darlington-connected with the pair of transistors.

* * * * *